(12) United States Patent
Menjo

(10) Patent No.: US 12,109,934 B2
(45) Date of Patent: Oct. 8, 2024

(54) VEHICLE SYSTEM AND VEHICLE LAMP

(71) Applicant: KOITO MANUFACTURING CO., LTD., Tokyo (JP)

(72) Inventor: Yosuke Menjo, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 8 days.

(21) Appl. No.: 18/016,546

(22) PCT Filed: Jun. 21, 2021

(86) PCT No.: PCT/JP2021/023353
§ 371 (c)(1),
(2) Date: Jan. 17, 2023

(87) PCT Pub. No.: WO2022/014265
PCT Pub. Date: Jan. 20, 2022

(65) Prior Publication Data
US 2023/0278486 A1    Sep. 7, 2023

(30) Foreign Application Priority Data

Jul. 17, 2020 (JP) .................................. 2020-123081

(51) Int. Cl.
*B60Q 1/14*     (2006.01)
*B62J 6/023*    (2020.01)
*B62J 45/41*    (2020.01)

(52) U.S. Cl.
CPC ............. *B60Q 1/143* (2013.01); *B62J 6/023* (2020.02); *B62J 45/41* (2020.02);
(Continued)

(58) Field of Classification Search
CPC ............. B60Q 1/143; B60Q 2300/056; B60Q 2300/42; B60Q 2300/45; B62J 6/023; B62J 45/41
See application file for complete search history.

(56) References Cited

U.S. PATENT DOCUMENTS

2017/0198877 A1    7/2017  Suwa et al.
2019/0092222 A1    3/2019  Waragaya et al.
(Continued)

FOREIGN PATENT DOCUMENTS

JP    2019-059265 A    4/2019
JP    2019-160805 A    9/2019
(Continued)

OTHER PUBLICATIONS

International Search Report in corresponding International Application No. PCT/JP2021/023353, dated Jul. 20, 2021 (5 pages).
(Continued)

*Primary Examiner* — Abdulmajeed Aziz
*Assistant Examiner* — Jessica M Apenteng
(74) *Attorney, Agent, or Firm* — Osha Bergman Watanabe & Burton LLP

(57) ABSTRACT

A vehicle system, in a vehicle that travels around a corner by tilting a vehicle body toward a turning direction, includes a light source, an optical member configured to form a predetermined light distribution pattern including a plurality of regions formed in parallel in one direction by irradiating a front side of a lamp with light from the light source, a sensor configured to detect a lamp position of an object outside the vehicle, and a control unit configured to determine an upper end position of the object based on the lamp position, and to adjust the predetermined light distribution pattern such that among the plurality of regions, a first region including the upper end position is not irradiated with the light.

10 Claims, 9 Drawing Sheets

(52) U.S. Cl.
CPC .... *B60Q 2300/056* (2013.01); *B60Q 2300/42* (2013.01); *B60Q 2300/45* (2013.01)

(56) References Cited

U.S. PATENT DOCUMENTS

| | | | |
|---|---|---|---|
| 2020/0063936 A1 | 2/2020 | Suwa et al. | |
| 2020/0369200 A1* | 11/2020 | Endo | B60Q 1/143 |
| 2021/0114678 A1* | 4/2021 | Harada | B62J 6/023 |
| 2022/0074565 A1 | 3/2022 | Suwa et al. | |

FOREIGN PATENT DOCUMENTS

| | | | |
|---|---|---|---|
| WO | 2019-039051 A1 | 2/2019 | |
| WO | 2019-159765 A1 | 8/2019 | |

OTHER PUBLICATIONS

Written Opinion in corresponding International Application No. PCT/JP2021/023353, dated Jul. 20, 2021 (4 pages).
Notice of Reasons for Refusal in corresponding Japanese Application No. 2022-536196, dated Aug. 13, 2024 (5 pages).

\* cited by examiner

| | INTERVAL W (m) BETWEEN P1 AND P2 | VEHICLE HEIGHT H + h (m) | HEIGHT H (m) BETWEEN P1 AND P3 | RATIO k (H/W) |
|---|---|---|---|---|
| SEDAN | 1.8 | 1.5 | 1.0 | 0.56 |
| LIGHT BOXCAR | 1.5 | 1.8 | 1.3 | 0.87 |
| COMPACT CAR | 1.6 | 1.5 | 1.0 | 0.63 |
| WAGON | 1.9 | 2.3 | 1.8 | 0.95 |
| LARGE BUS | 2.5 | 3.0 | 2.5 | 1.00 |
| 4-TON TRUCK | 2.3 | 2.6 | 2.1 | 0.91 |
| 10-TON TRUCK | 2.5 | 3.0 | 2.5 | 1.00 | ially # VEHICLE SYSTEM AND VEHICLE LAMP

TECHNICAL FIELD

The present invention relates to a vehicle system and a vehicle lamp.

BACKGROUND ART

As headlamps for a two-wheeled vehicle, there are high beam and low beam light sources (Patent Literature 1).

CITATION LIST

Patent Literature

Patent Literature 1: WO2019/039051

SUMMARY OF INVENTION

Technical Problem

In a four-wheeled vehicle, a system has been proposed in which a light distribution pattern radiated from a headlamp includes a plurality of regions arranged in parallel in a horizontal direction, and a part of the plurality of regions is not irradiated with light corresponding to an object outside the vehicle, thereby forming a light distribution pattern that does not give a glare to, for example, an oncoming vehicle. In a two-wheeled vehicle, when turning right or left, a driver drives the vehicle around a corner while moving a center of gravity to tilt a vehicle body toward a turning direction and to increase a bank angle, and thus a light distribution pattern formed by a headlamp is also tilted from a horizontal direction in accordance with the bank angle of the vehicle body. Therefore, in the light distribution pattern tilted from the horizontal direction, there is a case where light is radiated to a range where the light is originally not radiated, and a glare is given to an object such as an oncoming vehicle.

An object of the present invention is to provide a vehicle system and a vehicle lamp that forms a predetermined light distribution pattern capable of preventing occurrence of a glare to an object even when a vehicle body is tilted.

Solution to Problem

In order to achieve the above object, a vehicle system according to one aspect of the present invention is a vehicle system provided in a vehicle that travels around a corner by tilting a vehicle body toward a turning direction, the vehicle system including:
 a light source;
 an optical member configured to form a predetermined light distribution pattern including a plurality of regions formed in parallel in one direction by irradiating a front side of a lamp with light from the light source;
 a sensor configured to detect a lamp position of an object outside the vehicle; and
 a control unit configured to determine an upper end position of the object based on the lamp position, and to adjust the predetermined light distribution pattern such that among the plurality of regions, a first region including the upper end position is not irradiated with the light.

A vehicle lamp according to one aspect of the present invention is a vehicle lamp provided in a vehicle capable of traveling around a corner by tilting a vehicle body toward a turning direction, the vehicle lamp including:
 a light source;
 an optical member configured to form a predetermined light distribution pattern including a plurality of regions formed in parallel in a horizontal direction by irradiating a front side of the lamp with light from the light source; and
 a control unit configured to, when an object is present outside the vehicle, determine an upper end position of the object based on a lamp position of the object, and to adjust the predetermined light distribution pattern such that among the plurality of regions, the region including the upper end position is not irradiated with the light

Advantageous Effects of Invention

According to the present invention, a vehicle system and a vehicle lamp which form a predetermined light distribution pattern capable of preventing occurrence of a glare to an object even when a vehicle body is tilted are provided.

DESCRIPTION OF EMBODIMENTS

Embodiments of the present invention will be described with reference to the drawings. In the present embodiment, a "left-right direction", a "front-rear direction", and an "up-down direction" are relative directions set for a vehicle 100 shown in FIG. 1 for the convenience of description.

First Embodiment

Figure 1:
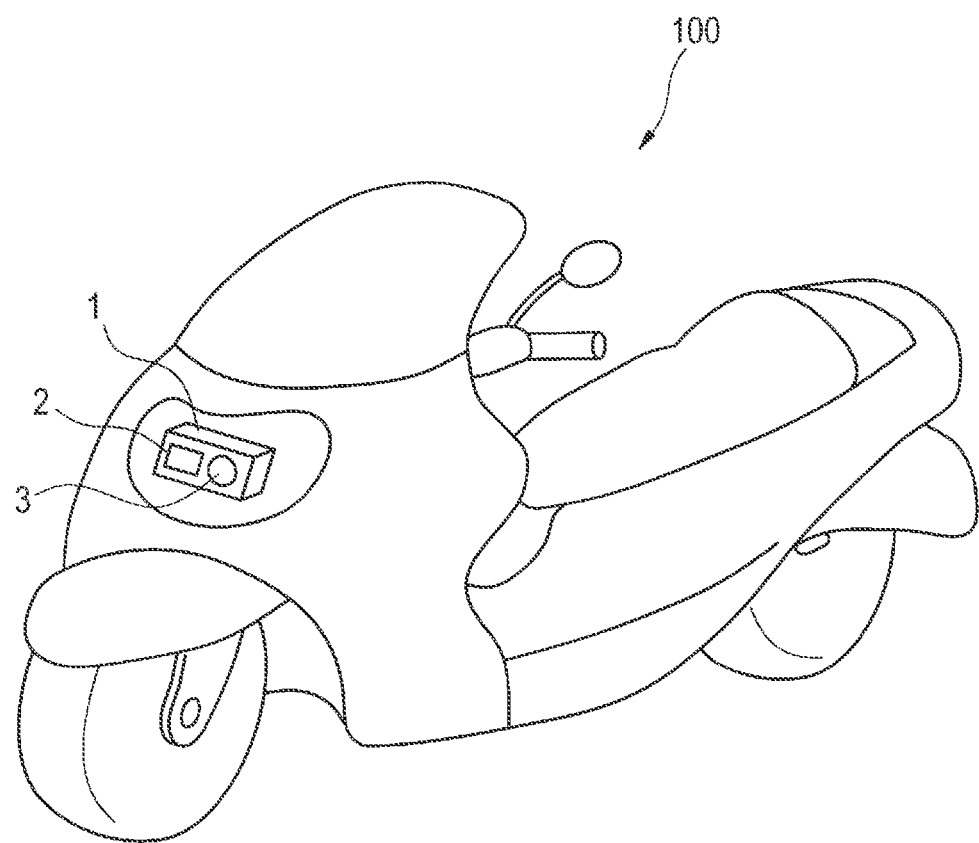
FIG. 1 is a perspective view of a vehicle including a headlamp (a vehicle lamp) according to a first embodiment of the present invention.

FIG. 1 shows the automatic two-wheeled vehicle 100 serving as an example of a vehicle according to the first embodiment. The automatic two-wheeled vehicle 100 is a vehicle capable of traveling along a corner (a curve) of a road by tilting a vehicle body toward a turning direction. The number of wheels of the vehicle according to the present embodiment is not limited as long as the vehicle can travel around a corner by tilting a vehicle body toward a turning direction, such as the automatic two-wheeled vehicle 100. Therefore, for example, an automatic three-wheeled vehicle and an automatic four-wheeled vehicle are also included in the vehicle according to the present embodiment as long as the vehicle can travel in the same manner as the automatic two-wheeled vehicle 100.

As shown in FIG. 1, a headlamp 1 (an example of a vehicle lamp) according to the present embodiment is mounted on a front portion of the automatic two-wheeled vehicle 100. The headlamp 1 is a lamp capable of illuminating a front side of the vehicle, and includes a low beam lamp unit 2 and a high beam lamp unit 3. Although an example in which the automatic two-wheeled vehicle 100 includes one headlamp 1 is described in the present embodiment, the automatic two-wheeled vehicle may include, for example, one headlamp at a right side and one headlamp at a left side.

Figure 2:
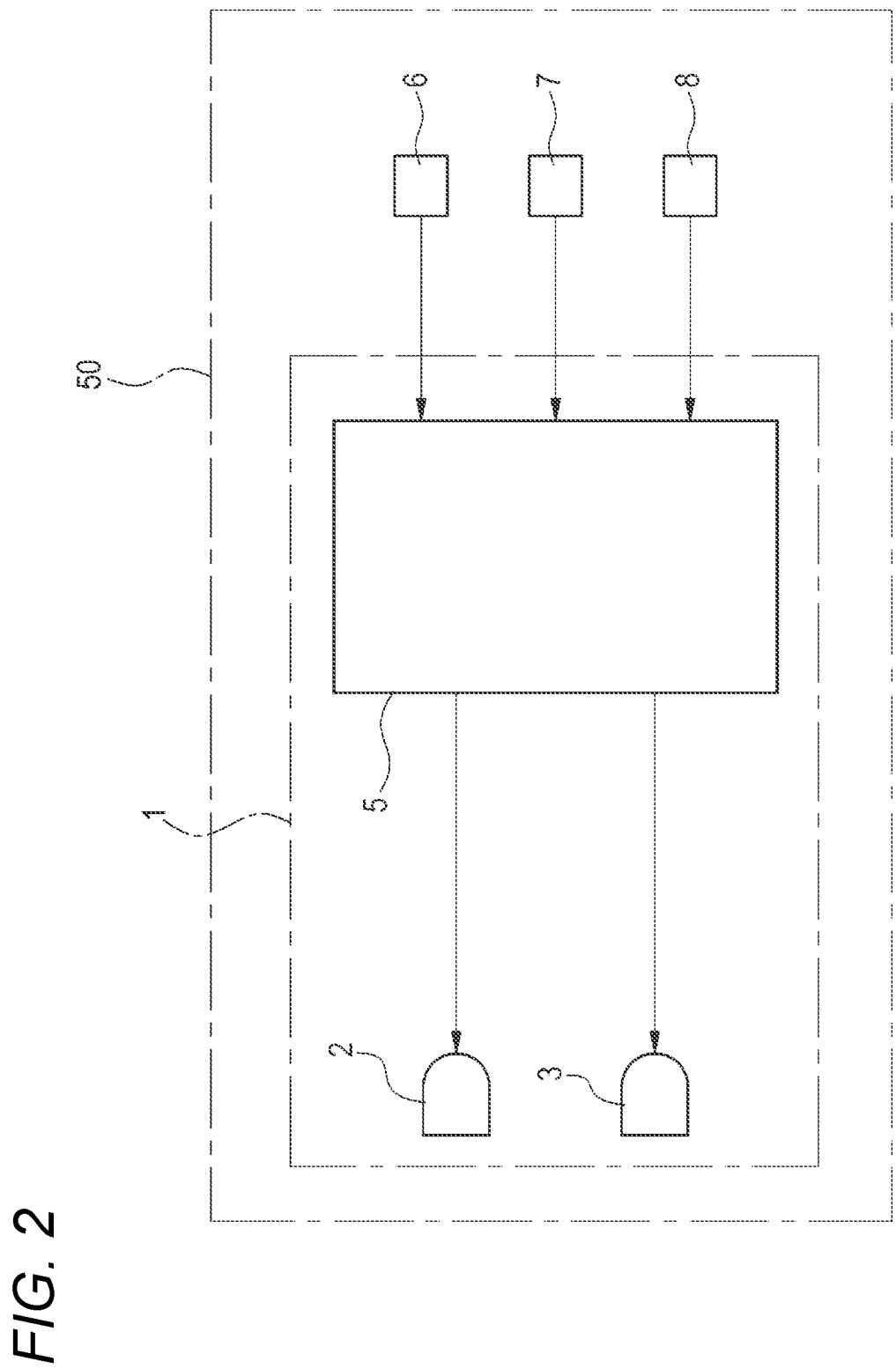
FIG. 2 is a block diagram of a vehicle system mounted in the vehicle.

FIG. 2 is a block diagram of a vehicle system 50 mounted in the automatic two-wheeled vehicle 100. As shown in FIG. 2, the vehicle system 50 includes the headlamp 1 and various sensors 6 to 8. The headlamp 1 includes a lamp control unit 5 that controls operations of the low beam lamp unit 2 and the high beam lamp unit 3. The low beam lamp unit 2 and the high beam lamp unit 3 are connected to the lamp control unit 5. The various sensors 6 to 8 include the bank angle sensor 6 that detects a tilting state of the automatic two-wheeled vehicle 100, the external sensor 7 that detects environment information about the outside of the vehicle, and the speed sensor 8 that detects a speed of the automatic two-wheeled vehicle 100. The bank angle sensor 6, the external sensor 7, and the speed sensor 8 are connected to the lamp control unit 5.

The bank angle sensor 6 is a sensor capable of detecting a tilting angle when the vehicle body of the automatic two-wheeled vehicle 100 is tilted leftward or rightward with respect to a vertical line. The bank angle sensor 6 is implemented by, for example, a gyro sensor. The tilting angle of the vehicle body may be calculated based on, for example, an image captured by a camera mounted on the vehicle body.

The external sensor 7 is a sensor capable of acquiring information about the outside of a host vehicle which includes surroundings of the automatic two-wheeled vehicle 100 (for example, obstacles, other vehicles (preceding vehicles, oncoming vehicles), pedestrians, road shapes, and traffic signs). The external sensor 7 includes, for example, at least one of light detection and ranging or laser imaging detection and ranging (LiDAR), a camera, and a radar.

Information detected by the bank angle sensor 6, the external sensor 7, and the speed sensor 8 is transmitted to the lamp control unit 5. The lamp control unit 5 controls the operations of the low beam lamp unit 2 and the high beam lamp unit 3 based on the information transmitted from the sensors 6 to 8. For example, the lamp control unit 5 can control the headlamp 1 (the low beam lamp unit 2 and the high beam lamp unit 3) based on the information detected by the sensors to adjust light distribution patterns (a low beam light distribution pattern and a high beam light distribution pattern) formed in front of the vehicle.

Figure 3:
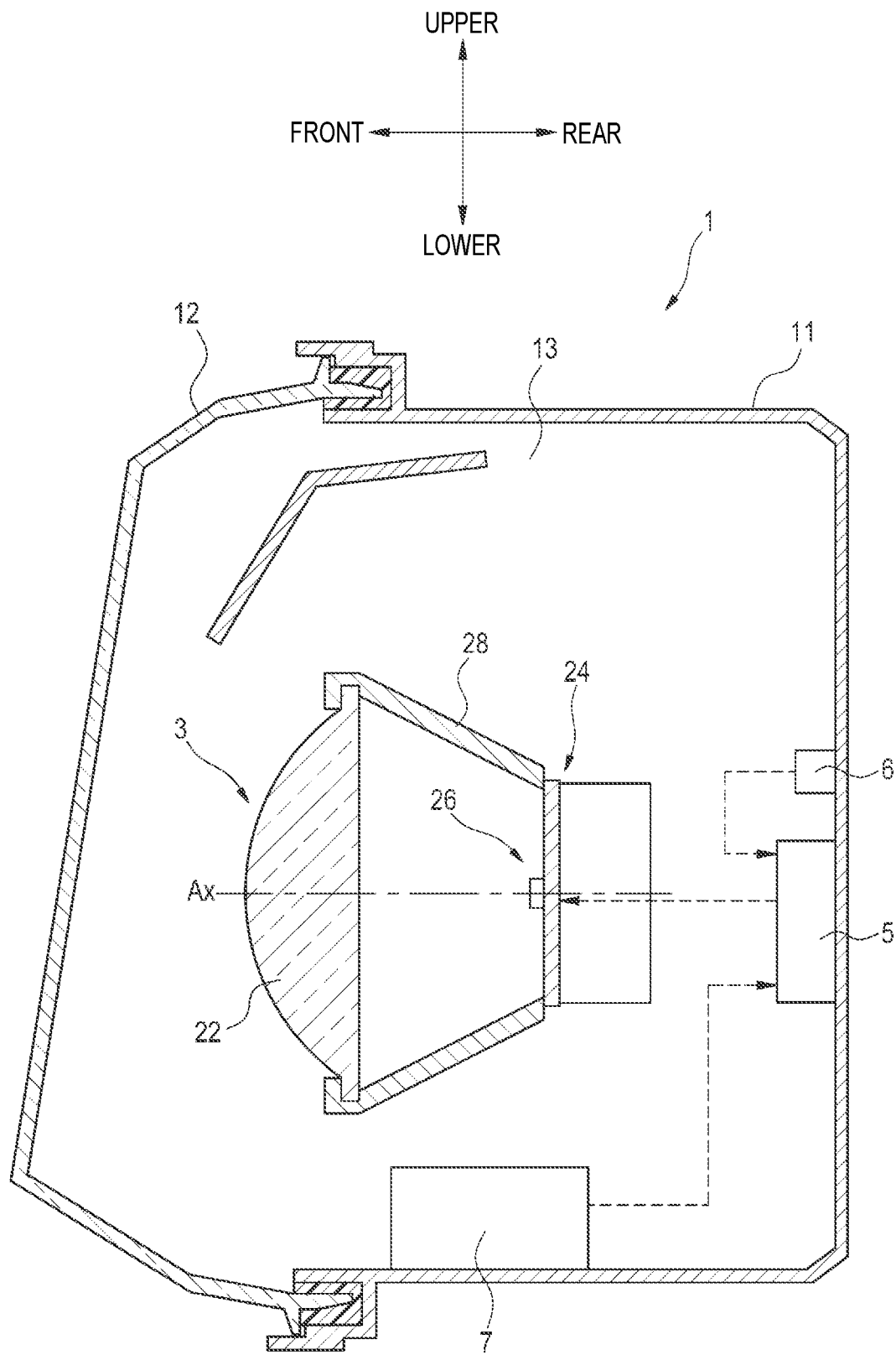
FIG. 3 is a cross-sectional view showing a configuration of a high beam lamp unit provided in the headlamp.

FIG. 3 is a vertical cross-sectional view showing a schematic configuration of the headlamp 1 in which the high beam lamp unit 3 is accommodated. As shown in FIG. 3, the headlamp 1 includes a lamp body 11 having an opening at a vehicle front side, and a transparent front cover 12 attached in a manner of covering the opening of the lamp body 11. The high beam lamp unit 3, the lamp control unit 5, the bank angle sensor 6, the external sensor (for example, the LiDAR) 7, and the like are accommodated in a lamp chamber 13 formed by the lamp body 11 and the front cover 12. Although not shown in the cross-sectional view of FIG. 3, the low beam lamp unit 2 is also accommodated in the lamp chamber 13 of the headlamp 1 in the same manner as the high beam lamp unit 3.

The high beam lamp unit 3 is a so-called projector type lamp, and includes a projection lens 22 (an example of an optical member), a light source unit 24 including a high beam light source 26, and a holder 28 that holds the projection lens 22 and the light source unit 24. The projection lens 22 is a plano-convex aspherical lens having a convex front surface and a flat rear surface, and is disposed on an optical axis Ax extending in the front-rear direction of the vehicle. A peripheral edge portion of the projection lens 22 is held at a front end side of the holder 28. The projection lens 22 forms the predetermined light distribution patterns including a plurality of regions by irradiating a front side of the lamp with light from the light source 26.

The light source unit 24 is disposed such that the light source 26 faces forward in a direction of the optical axis Ax, and is held at a rear end side of the holder 28. The light source 26 is electrically connected to the lamp control unit 5. The holder 28 is attached to the lamp body 11 via a support member (not shown).

Figure 4:
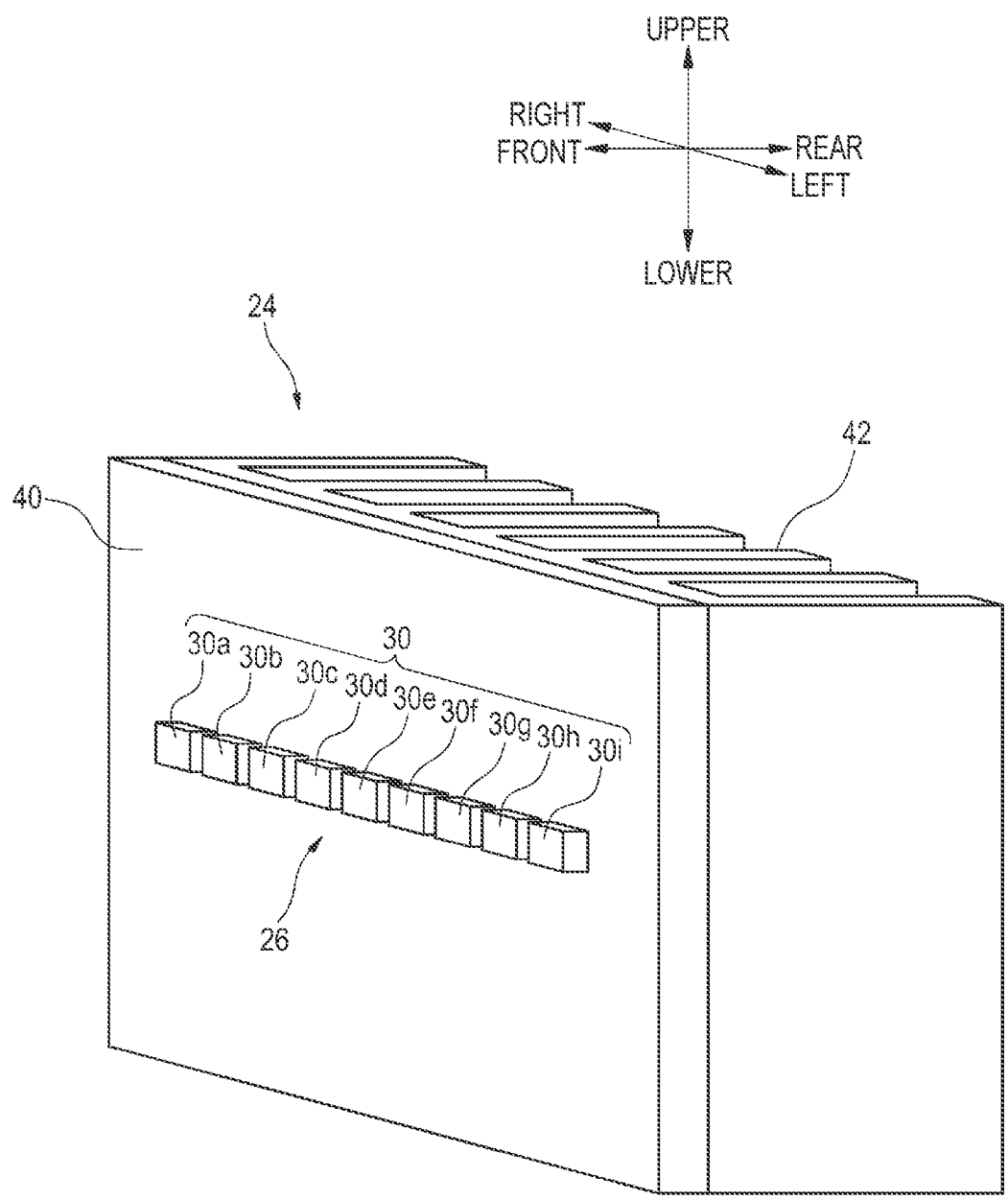
FIG. 4 is a perspective view showing a configuration of a light source unit provided in the high beam lamp unit in FIG. 3.

FIG. 4 is a perspective view showing a schematic structure of the light source unit 24. The light source unit 24 includes the light source 26, a support plate 40, and a heat sink 42. The light source 26 includes a plurality of individual light sources 30 implemented by light emitting elements such as light emitting diodes (LEDs). The light source 26 includes, for example, individual light sources 30a to 30i which are arranged in parallel in nine horizontal columns and one vertical row in the left-right direction (a direction perpendicular to the optical axis Ax), and is fixed to a front surface of the support plate 40. The individual light sources 30a to 30i are configured as an LED array. The individual light sources 30a to 30i are electrically connected to the lamp control unit 5. The individual light sources 30a to 30i are independently from each other and controlled for light irradiation by the lamp control unit 5 in an adaptive driving beam (ADB) mode which will be described later. The number and arrangement of the individual light sources 30 are not particularly limited.

The heat sink 42 is a member for dissipating heat generated from the light source 26, and is held on a surface of the support plate 40 at a vehicle rear side. The light source unit 24 is fixed to the holder 28 via the support plate 40.

Next, light distribution patterns formed by the headlamp 1 mounted on the automatic two-wheeled vehicle 100 will be described with reference to FIGS. 5 to 8.

Figure 5:
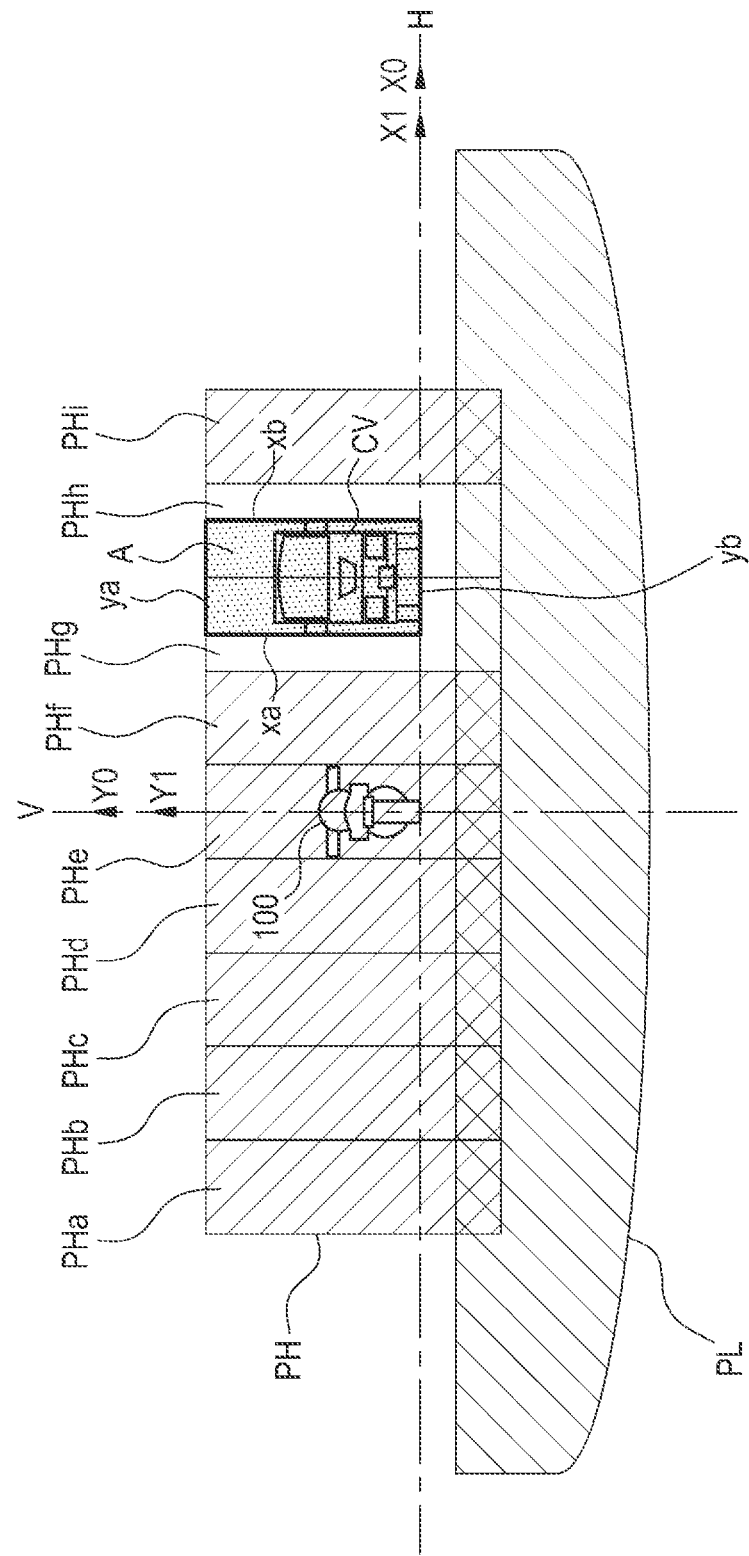
FIG. 5 is a diagram illustrating a high beam light distribution pattern.
Figure 6:
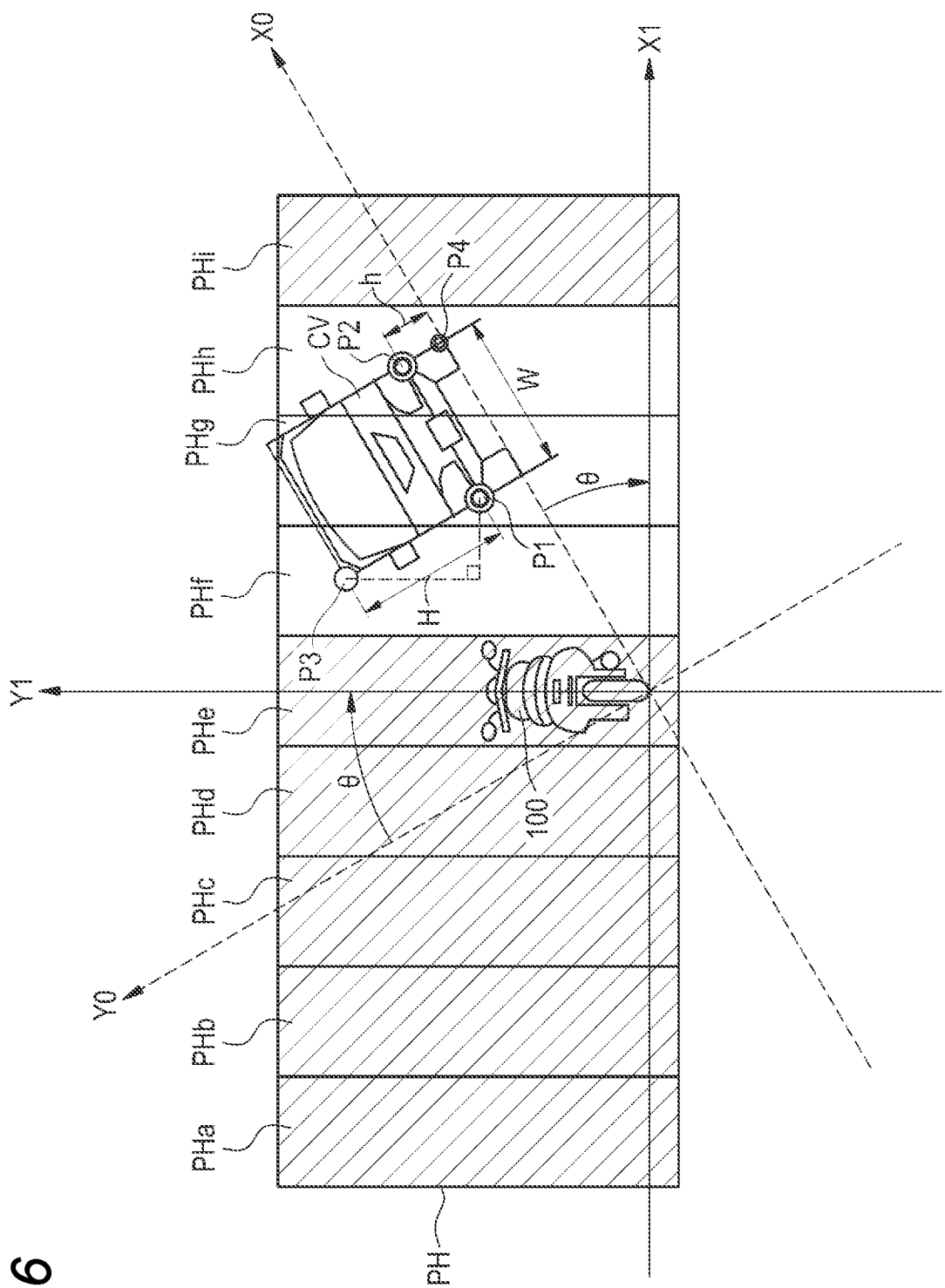
FIG. 6 is a diagram illustrating a high beam light distribution pattern during cornering.
Figures 7, 8:
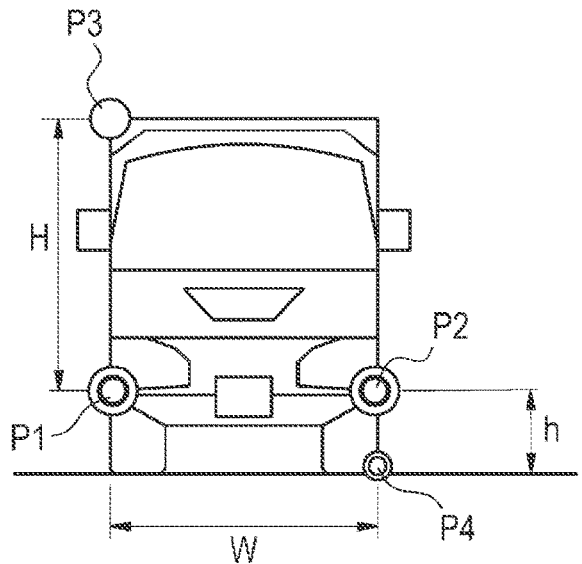
FIG. 7 is a diagram illustrating a relation between a lamp interval and an upper end position of another vehicle such as an oncoming vehicle.
FIG. 8 is a table showing a result of measuring a ratio of the lamp interval to the upper end position of the vehicle in FIG. 7 for each vehicle type.

FIG. 5 shows light distribution patterns (a high beam light distribution pattern PH and a low beam light distribution pattern PL) formed in front of the lamp when the vehicle body of the automatic two-wheeled vehicle 100 is traveling straight, that is, when the automatic two-wheeled vehicle 100 is traveling with the vehicle body perpendicular to a road surface. A case where the vehicle body of the automatic two-wheeled vehicle 100 is traveling straight includes, for example, a case where the tilting of the vehicle body is within ±10 degrees relative to a case where the vehicle body is perpendicular. FIG. 6 shows a light distribution pattern (in the present example, only the high beam light distribution pattern PH is shown) formed in front of the lamp when the vehicle body of the automatic two-wheeled vehicle 100 is cornering, for example, when the automatic two-wheeled vehicle 100 is traveling with the vehicle body tilted rightward with respect to a road surface in order to travel around a corner to the right. The high beam light distribution pattern PH is a light distribution pattern formed by the high beam lamp unit 3. The low beam light distribution pattern PL is a light distribution pattern formed by the low beam lamp unit 2. FIG. 7 is a diagram showing a relation between an upper end position and a lamp interval of another vehicle (an oncoming vehicle, a preceding vehicle, and the like).

FIGS. 5 and 6 show the light distribution patterns formed on a virtual vertical screen disposed at a predetermined position in front of the lamp, for example, at a position 25 m in front of the lamp. A vehicle shown separately from the automatic two-wheeled vehicle 100 is an oncoming vehicle CV traveling on a right front side of the automatic two-wheeled vehicle 100. The automatic two-wheeled vehicle 100 and the oncoming vehicle CV are displayed in respective coordinate systems. The oncoming vehicle CV is displayed in a road coordinate system X0-Y0. The automatic two-wheeled vehicle 100 is displayed in a two-wheeled vehicle coordinate system X1-Y1. In the case of FIG. 5 in which the automatic two-wheeled vehicle 100 is traveling straight, the road coordinate system X0-Y0 and the two-wheeled vehicle coordinate system X1-Y1 are displayed in a manner of coinciding with each other. In the case of FIG. 6 in which the automatic two-wheeled vehicle 100 is cornering, the road coordinate system X0-Y0 and the two-wheeled vehicle coordinate system X1-Y1 are displayed with a difference corresponding to an angle at which the automatic two-wheeled vehicle 100 is tilted. Here, H-H represents a horizontal direction, and V-V represents a vertical direction.

As shown in FIGS. 5 and 6, the high beam light distribution pattern PH is a light distribution pattern in which a plurality of vertically elongated partial patterns PHa to PHi are arranged along the horizontal direction. The partial patterns PHa to PHi are respectively formed by the light emitted from the individual light sources 30a to 30i. The partial pattern PHa is a pattern formed by the individual light source 30a. Similarly, the partial pattern PHb is formed by the individual light source 30b, the partial pattern PHc is formed by the individual light source 30c, the partial pattern PHd is formed by the individual light source 30d, the partial pattern PHe is formed by the individual light source 30e, the partial pattern PHf is formed by the individual light source 30f, the partial pattern PHg is formed by the individual light source 30g, the partial pattern PHh is formed by the individual light source 30h, and the partial pattern PHi is formed by the individual light source 30i. The high beam light distribution pattern PH is formed by a combination of formation and non-formation of the partial patterns PHa to PHi in the ADB mode as a high beam light distribution pattern having a different form in correspondence to a situation of the host vehicle, an oncoming vehicle, or a preceding vehicle.

Next, the ADB mode executed by the lamp control unit 5 will be described. For example, the lamp control unit 5 detects the situation of the oncoming vehicle which includes the presence or absence of the oncoming vehicle and a presence position of the oncoming vehicle (a distance from the automatic two-wheeled vehicle 100 to the oncoming vehicle, position coordinates of the oncoming vehicle on the virtual vertical screen, and the like) based on the environment information acquired by the external sensor 7. The lamp control unit 5 detects a situation of the host vehicle based on, for example, tilting angle information of the vehicle body which is acquired by the bank angle sensor 6. The lamp control unit 5 detects a situation of the host vehicle which includes traveling and stopping of the host vehicle based on, for example, speed information acquired by the speed sensor 8. The lamp control unit 5 individually controls turning on and off of the individual light sources 30 based on the information acquired by the external sensor 7, the bank angle sensor 6, and the speed sensor 8. Among the individual light sources 30, the lamp control unit 5 turns on the individual light source 30 corresponding to a region in which the object such as the oncoming vehicle is not present, and turns off the individual light source 30 corresponding to a region in which the object such as the oncoming vehicle is present.

For example, in FIG. 5, the lamp control unit 5 calculates a direction where the oncoming vehicle CV is present (positions on left and right side portions of the oncoming vehicle CV), a distance from the automatic two-wheeled vehicle 100 to the oncoming vehicle CV, and the like, based on the information acquired by the external sensor 7 and the speed sensor 8. The lamp control unit 5 calculates a traveling tilting angle of the host vehicle based on the information acquired by the bank angle sensor 6. The lamp control unit 5 defines a light shielding range A for preventing the oncoming vehicle CV from being irradiated with the light based on the information acquired by the external sensor 7, the bank angle sensor 6, and the like. The light shielding range A is defined as a range in an X0 axis direction between a boundary line xa that passes through a left side portion of the oncoming vehicle CV and extends in a Y0 axis direction and a boundary line xb that passes through a right side portion of the oncoming vehicle CV and extends in the Y0 axis direction in the road coordinate system X0-Y0. In addition, the light shielding range A is defined as a range in the Y0 axis direction between a boundary line ya that extends in the X0 axis direction and passes through points where the boundary lines xa and xb intersect an upper boundary of the high beam light distribution pattern PH in the two-wheeled vehicle coordinate system X1-Y1 and a boundary line yb that extends in the X0 axis direction and passes through points where the boundary lines xa and xb intersect an X1 axis of the two-wheeled vehicle coordinate system X1-Y1. The light shielding range A may be defined as a range slightly larger than the oncoming vehicle CV or a range slightly smaller than the oncoming vehicle CV.

In the case of the example of FIG. 5 in which the road coordinate system X0-Y0 and the two-wheeled vehicle coordinate system X1-Y1 coincide with each other, a coordinate value of each point in the light shielding range A in the road coordinate system X0-Y0 is associated with the same coordinate value in the high beam light distribution pattern PH in the two-wheeled vehicle coordinate system X1-Y1. In the high beam light distribution pattern PH in the two-wheeled vehicle coordinate system X1-Y1, the lamp control unit 5 specifies the partial pattern corresponding to the region in which the oncoming vehicle CV is not present based on the defined light shielding range A. In FIG. 5, the lamp control unit 5 specifies the partial patterns PHa to PHf and PHi as the partial patterns in which the oncoming vehicle CV is not present. The lamp control unit 5 determines the specified partial patterns PHa to PHf and PHi as irradiation regions. The lamp control unit 5 turns on the individual light sources 30a to 30f and 30i corresponding to the irradiation regions (the partial patterns PHa to PHf and PHi). On the other hand, in the high beam light distribution pattern PH in the two-wheeled vehicle coordinate system X1-Y1, the lamp control unit 5 specifies the partial patterns PHg and PHh corresponding to regions in which the oncoming vehicle CV is present as non-irradiation regions (light shielding regions) based on the defined light shielding range A, and determines the specified partial patterns PHg and PHh as the non-irradiation regions (light shielding regions). The lamp control unit 5 turns off the individual light sources 30g and 30h corresponding to the non-irradiation regions (partial patterns PHg and PHh).

Accordingly, when the automatic two-wheeled vehicle 100 is traveling straight, the high beam light distribution pattern PH including, as the non-irradiation regions, the partial patterns PHg and PHh corresponding to the regions in which the oncoming vehicle CV is present is formed to include the light shielding range A for not irradiating the oncoming vehicle CV with the light. The "non-irradiation region" may include a region in which the light is radiated at a low illuminance to an extent that a glare is not given to a driver of the oncoming vehicle.

Next, as shown in FIG. 6, when the automatic two-wheeled vehicle 100 is cornering, for example, when the vehicle body is tilted rightward by an angle θ relative to the road surface, the two-wheeled vehicle coordinate system X1-Y1 is tilted by the angle θ relative to the road coordinate system X0-Y0. Therefore, the oncoming vehicle CV traveling in the road coordinate system X0-Y0 is tilted leftward by the angle θ when viewed from the automatic two-wheeled vehicle 100. In FIG. 6, the two-wheeled vehicle coordinate system X1-Y1 is displayed along a horizontal direction and a vertical direction of a paper plane.

Also in the example shown in FIG. 6, the lamp control unit 5 calculates various information related to the automatic two-wheeled vehicle 100 and the oncoming vehicle CV based on the information acquired by the bank angle sensor 6, the external sensor 7, the speed sensor 8, and the like. For example, the lamp control unit 5 calculates coordinate values of a pair of headlamps (left lamp P1, right lamp P2) mounted on the oncoming vehicle CV. The coordinate value of the left lamp P1 is calculated as a coordinate value (x11, y11) in the two-wheeled vehicle coordinate system X1-Y1. The coordinate value of the right lamp P2 is calculated as a coordinate value (x12, y12) in the two-wheeled vehicle coordinate system X1-Y1.

The lamp control unit 5 calculates an interval W between the left lamp P1 and the right lamp P2 based on the calculated coordinate value (x11, y11) of the left lamp P1 and the calculated coordinate value (x12, y12) of the right lamp P2. The lamp control unit 5 calculates a height H from the left lamp P1 of the oncoming vehicle CV to an upper left point P3 which is a left upper end position of the oncoming vehicle CV based on the calculated interval W between the left lamp P1 and the right lamp P2. The height H from the left lamp P1 to the upper left point P3 can be calculated by multiplying the interval W between the left lamp P1 and the right lamp P2 by a predetermined constant k.

The predetermined constant k is obtained as follows. As shown in FIG. 7, the interval W between the left and right lamps P1 and P2 and the height H from the left lamp P1 to the upper left point P3 are measured for various vehicles, and a ratio H/W is calculated. FIG. 8 is a table showing a result of measuring the ratio H/W of the interval W between the P1 and P2 to the height H between the P1 and P3 for each vehicle type. In the present example, the ratio H/W is calculated for a sedan, a light boxcar, a compact car, a wagon, a large bus, a 4-ton truck, and a 10-ton truck. A height h from the ground to the left or right lamp P1 or P2 is set to 0.5 m common in the vehicle types. As shown in FIG. 8, in each ratio H/W calculated for each vehicle type, a maximum value is 1.00 for the large bus and the 10-ton truck. It can be seen from the measurement result that the value of the height H from the left lamp P1 to the upper left point P3 in the various vehicles is equal to or less than the value of the interval W between the left and right lamps. Accordingly, in order to calculate the height H from the left lamp P1 to the upper left point P3, the constant k multiplied by the interval W between the left lamp P1 and the right lamp P2 is set to k=1 in consideration of the maximum value of the ratio H/W of various vehicles assumed as the oncoming vehicles.

Next, the lamp control unit 5 calculates a coordinate value (x13, y13) of the upper left point P3 in the two-wheeled vehicle coordinate system X1-Y1 based on the calculated height H from the left lamp P1 to the upper left point P3 and the calculated coordinate value (x11, y11) of the left lamp P1. The coordinate value x13 of the upper left point P3 can be calculated by x13=x11−H sin θ. The coordinate value y13 of the upper left point P3 can be calculated by y13=y11+H cos θ. The upper left point P3 is a point located closest to the automatic two-wheeled vehicle 100 (a leftmost point) of the oncoming vehicle CV that is tilted leftward when viewed from the automatic two-wheeled vehicle 100. The coordinate value of the upper left point P3 in the two-wheeled vehicle coordinate system X1-Y1 is a value that changes in accordance with the tilting angle of the vehicle body.

Next, the lamp control unit 5 specifies the partial pattern of the high beam light distribution pattern PH which includes the coordinate value x13 in a region in an X1 axis direction, as a region corresponding to the coordinate value (x13, y13) of the upper left point P3 in the two-wheeled vehicle coordinate system X1-Y1. In the example shown in FIG. 6, the lamp control unit 5 specifies the partial pattern PHf (an example of the first region) of the high beam light distribution pattern PH as the region corresponding to the coordinate value (x13, y13) of the upper left point P3. The lamp control unit 5 determines, as the non-irradiation regions, regions extending from the partial pattern PHf to the partial pattern PHh which include the partial patterns PHg and PHh specified as the regions in which the oncoming vehicle CV is present when the automatic two-wheeled vehicle 100 is traveling straight and the partial pattern PHf specified as the region corresponding to the coordinate value (x13, y13) of the upper left point P3. The lamp control unit 5 turns off the individual light sources 30f, 30g, and 30h corresponding to the non-irradiation regions (the partial patterns PHf, PHg, and PHh). On the other hand, the lamp control unit 5 determines the partial patterns PHa to PHe and PHi other than the partial patterns PHf, PHg, and PHh as the irradiation regions. The lamp control unit 5 turns on the individual light sources 30a to 30e and 30i corresponding to the irradiation regions (the partial patterns PHa to PHe and PHi).

Accordingly, when the automatic two-wheeled vehicle 100 is cornering, the high beam light distribution pattern PH including, as the non-irradiation region, the partial patterns PHf, PHg, and PHh corresponding to the regions in which the oncoming vehicle CV is present is formed such that the oncoming vehicle CV tilting relative to the automatic two-wheeled vehicle 100 is not irradiated with the light.

The tilting angle θ of the two-wheeled vehicle coordinate system X1-Y1 with respect to the road coordinate system X0-Y0 increases as the tilting of the vehicle body with respect to the road surface increases. Therefore, the larger the rightward tilting of the automatic two-wheeled vehicle 100 with respect to the road surface, the greater the leftward change in the coordinate value (x13, y13) of the upper left point P3 of the oncoming vehicle CV in the two-wheeled vehicle coordinate system X1-Y1 from the coordinate value of the upper left point P3 of the oncoming vehicle CV when traveling with the vehicle body perpendicular to the road surface. Accordingly, when the automatic two-wheeled vehicle 100 is cornering rightward, the position of the partial pattern of the high beam light distribution pattern PH specified as the region corresponding to the left upper end position of the oncoming vehicle CV moves leftward, and the range of the partial patterns determined as the non-irradiation region is increased by the partial pattern PHf in the example shown in FIG. 6.

As described above, the vehicle system 50 according to the present embodiment is provided in the automatic two-wheeled vehicle 100 that travels around the corner by tilting the vehicle body toward the turning direction. The vehicle system 50 includes the light source 26, the projection lens 22 (an example of the optical member) configured to form the predetermined high beam light distribution pattern PH including the plurality of partial patterns PHa to PHi formed in parallel in one direction by irradiating the front side of the headlamp 1 with the light from the light source 26, the external sensor 7 configured to detect the positions of the lamps P1 and P2 (examples of the lamp position) of the oncoming vehicle CV (an example of the object) outside the vehicle, and the lamp control unit 5 configured to determine the upper left point P3 (an example of the upper end position) of the oncoming vehicle CV based on the positions of the lamps P1 and P2, and to adjust the high beam light distribution pattern PH such that among the partial patterns PHa to PHi formed in parallel, the partial pattern PHf (an example of the first region) including the upper left point P3 of the oncoming vehicle CV is not irradiated with the light. According to the configuration, the coordinate value of the upper end of the oncoming vehicle CV is calculated based on the coordinate value of the headlamp 1 of the oncoming vehicle CV, which can be easily specified even at night, and thus the position of the upper end of the oncoming vehicle CV can be specified accurately. Accordingly, when the automatic two-wheeled vehicle 100 is tilted, the predetermined high beam light distribution pattern PH capable of preventing occurrence of a glare to the oncoming vehicle CV can also be easily formed. An object to be shielded from light is not limited to the oncoming vehicle CV, and the same control may be executed on a preceding vehicle.

According to the vehicle system 50, the oncoming vehicle CV is a vehicle mounted with the pair of lamps P1 and P2 arranged at t both left and right sides at a certain distance, and the lamp control unit 5 calculates the interval W between the pair of lamps P1 and P2 based on the positions of the lamps P1 and P2, and calculates the coordinate of the upper left point P3 of the oncoming vehicle CV by multiplying the interval W by the predetermined constant k. By using the constant k (k=1 in the present example) that indicates a relation between the position of the lamp P1 of the oncoming vehicle CV and the position of the upper left point P3 of the oncoming vehicle CV, a non-irradiation range in the high beam light distribution pattern PH can be easily determined.

According to the vehicle system 50, the plurality of partial patterns PHa to PHi are vertically elongated regions arranged in parallel in the left-right direction. Therefore, by switching the irradiation and non-irradiation for each of the partial patterns PHa to PHi, an appropriate light distribution pattern capable of preventing a glare to the oncoming vehicle CV can be easily formed.

According to the vehicle system 50, the light source 26 includes the plurality of individual light sources 30 (light emitting elements) arranged in parallel, the partial patterns PHa to PHi are formed in parallel along the horizontal direction by the light from the plurality of individual light sources 30, and the lamp control unit 5 turns off, among the plurality of individual light sources 30, the individual light source that forms the partial pattern including the upper left point P3 based on the position of the upper left point P3. In this manner, the non-irradiation region in the high beam light distribution pattern PH can be appropriately formed with a simple configuration of the light source 26 using, for example, an LED array.

The vehicle lamp (headlamp) 1 is provided in the automatic two-wheeled vehicle 100 capable of traveling around a corner by tilting the vehicle body toward a turning direction. The vehicle lamp includes the light source 26, the projection lens 22 configured to form the predetermined high beam light distribution pattern PH including the plurality of partial patterns PHa to PHi formed in parallel in the horizontal direction by irradiating the front side of the headlamp 1 with the light from the light source 26, and the lamp control unit 5 configured to, when the oncoming vehicle CV is present outside the vehicle, determine the upper left point P3 of the oncoming vehicle CV based on the positions of the lamps P1 and P2 of the oncoming vehicle CV, and adjust the high beam light distribution pattern PH such that among the partial patterns PHa to PHi, the region including the upper left point P3 is not irradiated with the light. According to the configuration, similar to the above vehicle system 50, when the automatic two-wheeled vehicle 100 is tilted, the predetermined high beam light distribution pattern PH capable of preventing the occurrence of the glare to the oncoming vehicle CV can be easily formed.

Although a case where the vehicle body of the automatic two-wheeled vehicle 100 is tilted rightward with respect to the road surface has been described in the present embodiment, for example, when the vehicle body of the automatic two-wheeled vehicle 100 is tilted leftward with respect to the road surface, the lamp control unit 5 can set the non-irradiation region of the high beam light distribution pattern PH in the same manner. Specifically, when the vehicle body is tilted leftward, the lamp control unit 5 specifies a coordinate value of an upper right point which is an upper end position of a right side of the oncoming vehicle CV, and sets a non-irradiation region for not giving a glare to the oncoming vehicle CV.

In the present embodiment, the upper end position of the oncoming vehicle CV is calculated based on the lamp position value of the headlamp, but the present invention is not limited thereto. For example, a coordinate value of a lamp other than the headlamp mounted on the oncoming vehicle CV, or a coordinate value of a member other than the lamp may be specified, and the upper end position of the oncoming vehicle CV may be calculated based on the specified coordinate value.

In the present embodiment, when setting the non-irradiation region during the cornering, the partial pattern Phf corresponding to the position of the upper left point P3 of the oncoming vehicle CV is specified, and the non-irradiation regions are set by adding the specified partial pattern PHf to the partial patterns PHg and PHh specified as the non-irradiation regions during the straight traveling. For example, in FIG. 6, a coordinate value (x14, y14) of a rightmost lower right point P4 of the oncoming vehicle CV is calculated based on the coordinate value of the right lamp P2, and the partial pattern PHh corresponding to a position of the calculated lower right point P4 may be specified. The partial patterns PHf, PHg, and PHh extending from the partial pattern PHf corresponding to the position of the upper left point P3 of the oncoming vehicle CV to the partial pattern PHh corresponding to the position of the lower right point P4 may be set as the non-irradiation regions. The coordinate value x14 of the lower right point P4 is calculated by $x14=x12+h \sin \theta$. The coordinate value y14 of the lower right point P4 is calculated by $y14=y12-h \cos \theta$. In the formula, h represents a value indicating the height of the headlamp P1 or P2, and is set to h=0.5 m common in the various vehicles as described above.

Second Embodiment

Next, a configuration of a high beam lamp unit 103 provided in a headlamp 101 according to a second embodiment will be described with reference to FIGS. 9 and 10.

Figure 9:
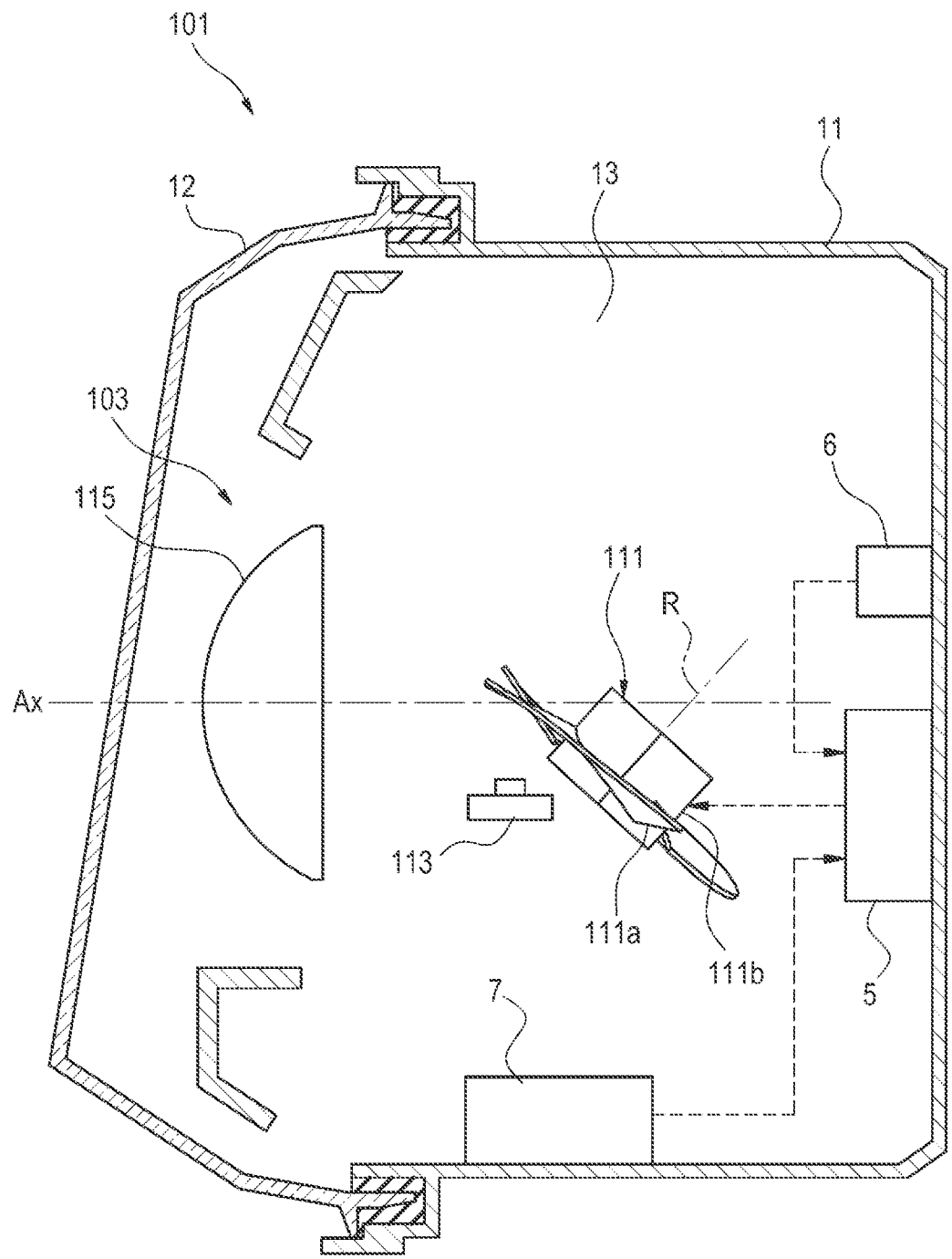
FIG. 9 is a cross-sectional view showing a configuration of a high beam lamp unit provided in a headlamp according to a second embodiment.

As shown in FIG. 9, the high beam lamp unit 103 is a projector type lamp. The high beam lamp unit 103 includes a rotation reflector 111 (an example of the optical member), an LED 113 (an example of the light source), and a projection lens 115 (an example of the optical member) disposed in front of the rotation reflector 111. Instead of the LED 113, a semiconductor light emitting element such as an EL element or an LD element may be used as the light source. In particular, a light source capable of being accurately turned on and off in a short time is preferably used in the control for not irradiating a part of a light distribution pattern which will be described later. A shape of the projection lens 115 may be appropriately selected according to required light distribution characteristics such as light distribution patterns and illuminance distribution, and an aspherical lens or a free-form surface lens is used. In the present embodiment, a convex aspherical lens is used as the projection lens 115.

The rotation reflector 111 is rotated in one direction about a rotation axis R by a driving source such as a motor (not shown). The rotation reflector 111 includes a reflecting surface configured to rotate and reflect light emitted from the LED 113 to form a desired light distribution pattern.

Figure 10:
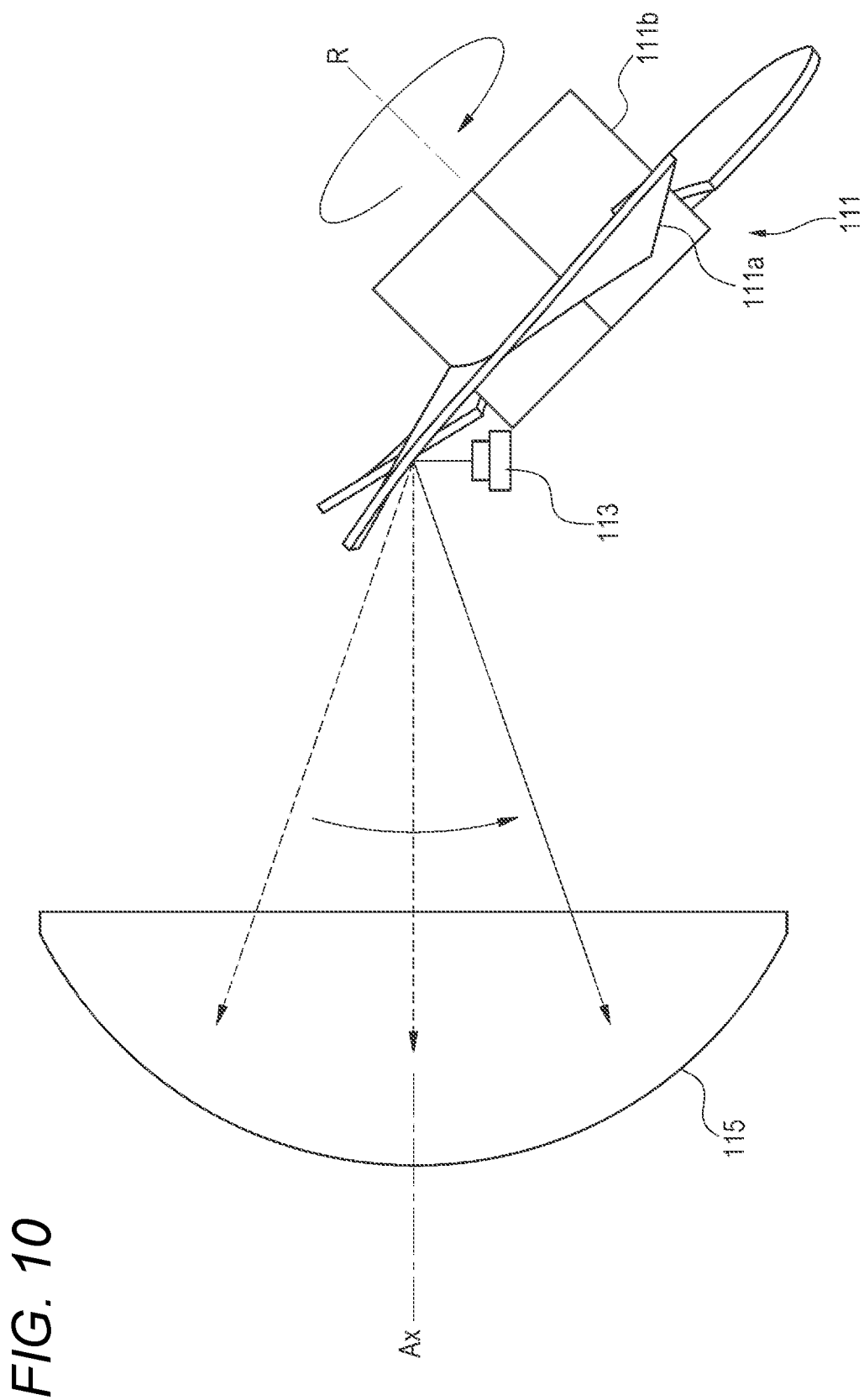
FIG. 10 is a diagram showing a configuration of an optical member provided in the high beam lamp unit in FIG. 9.

As shown in FIG. 10, the rotation reflector 111 includes three blades 111a having the same shape and a cylindrical rotation portion 111b. The blades 111a function as reflecting surfaces and are provided around the rotation portion 111b. The rotation axis R of the rotation reflector 111 is tilted relative to the optical axis Ax, and is set in a plane including the optical axis Ax and the LED 113.

The blade 111a has a twisted shape such that an angle formed by the optical axis Ax and the reflecting surface changes as the blade 111a goes in a circumferential direction around the rotation axis R. As a result, it is possible to perform scanning using the light of the LED 113 as shown in FIG. 9. Specifically, the rotation reflector 111 rotates by 120 degrees, so that a front side can be scanned once in one direction (the horizontal direction) with the light of the LED 113. That is, when one blade 111a passes the front side of the LED 113, a desired region in front of the vehicle is scanned once with the light of the LED 113.

Also in the second embodiment, the lamp control unit 5 determines the upper left point P3 (the upper end position) of the oncoming vehicle CV based on the positions (the lamp positions) of the lamps P1 and P2 of the oncoming vehicle CV (the object), and adjusts the high beam light distribution pattern PH such that among the plurality of partial patterns PHa to PHi, the partial pattern (the first region) including the upper left point P3 is not irradiated with the light. Specifically, the lamp control unit 5 calculates the interval W between the left lamp P1 and the right lamp P2, and multiplies the calculated interval W by the constant k=1 that indicates the relation between the lamp position and the upper end position of the oncoming vehicle CV, thereby calculating the height H from the left lamp P1 of the oncoming vehicle CV to the upper left point P3 which is the left upper end position of the oncoming vehicle CV. Next, the lamp control unit 5 calculates the coordinate value of the upper left point P3 in the two-wheeled vehicle coordinate system X1-Y1 based on the height H from the left lamp P1 to the upper left point P3 and the coordinate value of the left lamp P1. Next, the lamp control unit 5 specifies a corresponding partial pattern of the high beam light distribution pattern PH as a region corresponding to the coordinate value of the upper left point P3, and determines the specified partial pattern as the non-irradiation region. Then, the lamp control unit 5 synchronizes the timing of turning on and off the LED 113 with the rotation of the rotation reflector 111, thereby controlling operations of the LED 113 and the rotation reflector 111 such that the non-irradiation region of the high beam light distribution pattern PH is not irradiated with the light from the LED 113. That is, by controlling an emission timing of the light from the LED 113 and a scanning direction of the light determined by the rotation reflector 111, the high beam light distribution pattern PH is formed such that the non-irradiation region is not irradiated with the light. As described above, in the high beam lamp unit 103 of a scanning optical system including the rotation reflector 111, similar to the high beam lamp unit 3 according to the first embodiment including the LED array, when the vehicle body is tilted, the upper end position of the oncoming vehicle CV is calculated based on the interval W between the lamps P1 and P2 of the oncoming vehicle CV and the predetermined constant k, and the partial pattern corresponding to the upper end position is set as the non-irradiation region, so that the predetermined high beam light distribution pattern PH capable of preventing the occurrence of the glare to the oncoming vehicle CV can be easily formed.

Instead of the rotation reflector 111, a high beam lamp unit of a scanning optical system including a galvanometer mirror or a polygon mirror may be employed. In this case, the same effects as those of the first embodiment and the second embodiment can be achieved by performing the same control as described above.

Although embodiments of the present invention have been described above, it is needless to say that the technical scope of the present invention should not be interpreted as being limited to the description of the present embodiments. It is to be understood by those skilled in the art that the present embodiments are merely examples and various modifications can be made within the scope of the invention described in the claims. The technical scope of the present invention should be determined based on the scope of the inventions described in the claims and an equivalent scope thereof.

Although a configuration that the lamp control unit 5, the bank angle sensor 6, and the external sensor 7 are accommodated in the lamp chamber of the headlamp 1 has been disclosed in the embodiment described above, the present invention is not limited thereto. The lamp control unit 5, the bank angle sensor 6, and the external sensor 7 may be disposed separately from the headlamp 1.

The present application is based on Japanese Patent Application No. 2020-123081 filed on Jul. 17, 2020, and the contents of which are incorporated herein by reference.

The invention claimed is:

1. A vehicle system provided in a vehicle that travels around a corner by tilting a vehicle body toward a turning direction, the vehicle system comprising:
   a light source;
   an optical member configured to form a predetermined light distribution pattern including a plurality of regions formed in parallel in one direction by irradiating a front side of a lamp with light from the light source;
   a sensor configured to detect a lamp position of an object outside the vehicle; and
   a control unit configured to determine an upper end position of the object based on the lamp position, and to adjust the predetermined light distribution pattern such that among the plurality of regions, a first region including the upper end position is not irradiated with the light.

2. The vehicle system according to claim 1, wherein the object is a vehicle mounted with a pair of lamps arranged at both left and right sides at a certain distance, and
   the control unit is configured to:
   calculate an interval between the pair of lamps based on the lamp position, and
   calculate the upper end position by multiplying the interval by a predetermined constant.

3. The vehicle system according to claim 1, wherein the plurality of regions are vertically elongated regions arranged in parallel in a left-right direction.

4. The vehicle system according to claim 1, wherein the light source includes a plurality of light emitting elements arranged in parallel,
   the plurality of regions are formed in parallel along a horizontal direction by light from the plurality of light emitting elements, and
   the control unit turns off the light emitting element forming the first region among the plurality of light emitting elements based on the upper end position.

5. The vehicle system according to claim 1, wherein the optical member includes at least one of a rotation reflector, a galvanometer mirror, and a polygon mirror, and
   the control unit controls a scanning direction of the light determined by at least one of the rotation reflector, the galvanometer mirror, and the polygon mirror, and an emission timing of the light from the light source, based on the upper end position, and then forms the predetermined light distribution pattern such that the first region is not irradiated with the light.

6. A vehicle lamp provided in a vehicle capable of travelling around a corner by tilting a vehicle body toward a turning direction, the vehicle lamp comprising:
   a light source;
   an optical member configured to form a predetermined light distribution pattern including a plurality of regions formed in parallel in a horizontal direction by irradiating a front side of the lamp with light from the light source; and
   a control unit configured to, when an object is present outside the vehicle, determine an upper end position of the object based on a lamp position of the object, and to adjust the predetermined light distribution pattern such that among the plurality of regions, the region including the upper end position is not irradiated with the light.

7. A vehicle lamp provided in a vehicle capable of travelling around a corner by tilting a vehicle body toward a turning direction, the vehicle lamp comprising:
   a light source;
   an optical member configured to form a predetermined light distribution pattern including a plurality of regions formed in parallel in a horizontal direction by irradiating a front side of the lamp with light from the light source;
   and
   a control unit configured to adjust the predetermined light distribution,
   wherein the control unit is configured to, when an object is present outside the vehicle, reduce an illuminance of light for a first region of the plurality of the regions including a lamp position of the object and a second region adjacent to the first region and closer to the vehicle to an illuminance lower than an illuminance of light for regions other than the first region and the second region.

8. The vehicle lamp according to claim 7, wherein the control unit is configured to increase width of the second region as tilting of the vehicle increases.

9. The vehicle lamp according to claim 7, wherein the control unit is configured to, when the object is present, adjust the predetermined light distribution such that the first region and the second region are not irradiated with the light.

10. The vehicle lamp according to claim 7, wherein the control unit is configured to, when the object is present, adjust the predetermined light distribution such that the first region and the second region are irradiated with the light.

* * * * *